Sept. 26, 1961 J. F. HERBERT 3,001,441
ANHYDRO-BLEPHAROSTATIC CONTACT LENS
Filed Aug. 5, 1957 3 Sheets-Sheet 1
FIG_1_
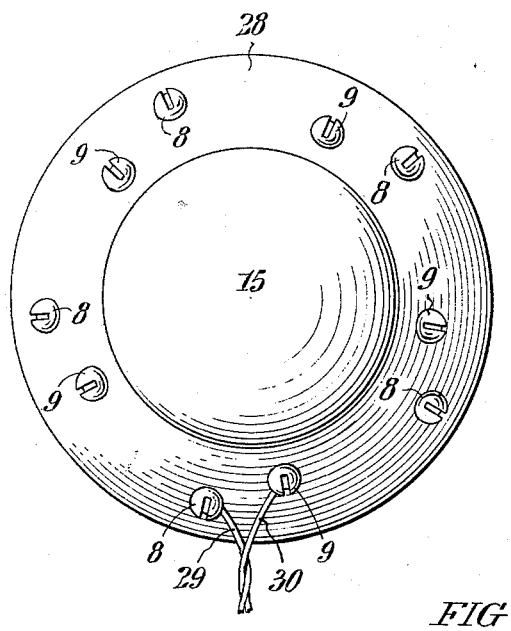
FIG_2_
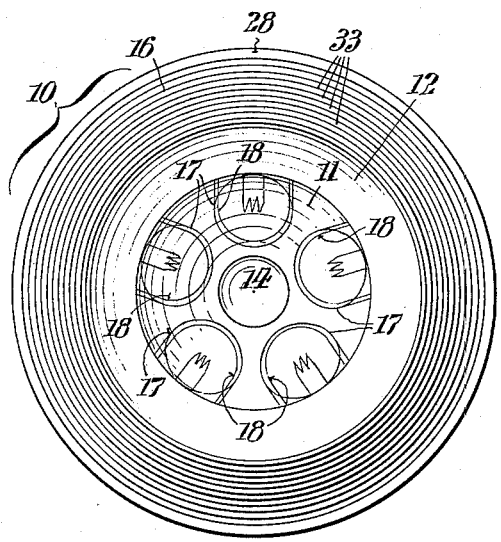
FIG_6_
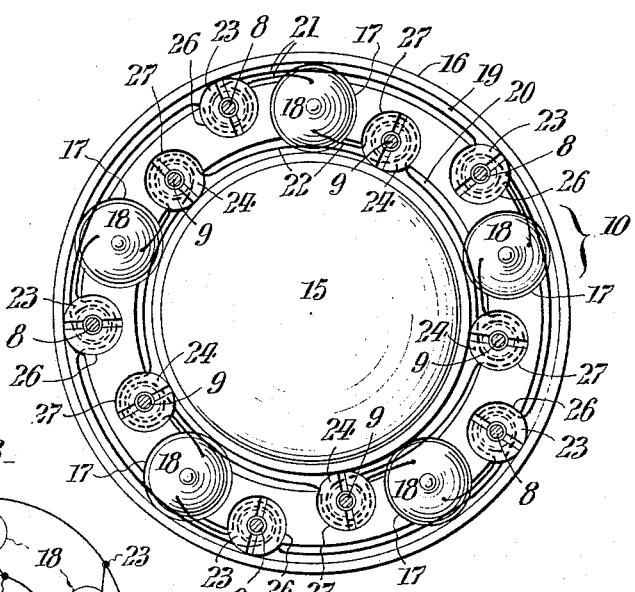
FIG_8_
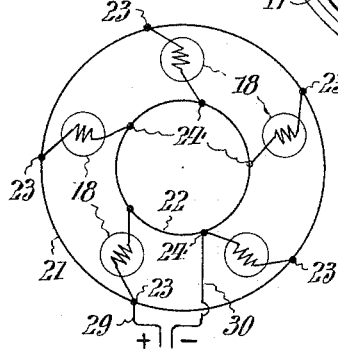
INVENTOR:
John Frederick Herbert,
BY Paul + Paul
ATTORNEYS.

Sept. 26, 1961  J. F. HERBERT  3,001,441
ANHYDRO-BLEPHAROSTATIC CONTACT LENS
Filed Aug. 5, 1957  3 Sheets-Sheet 2
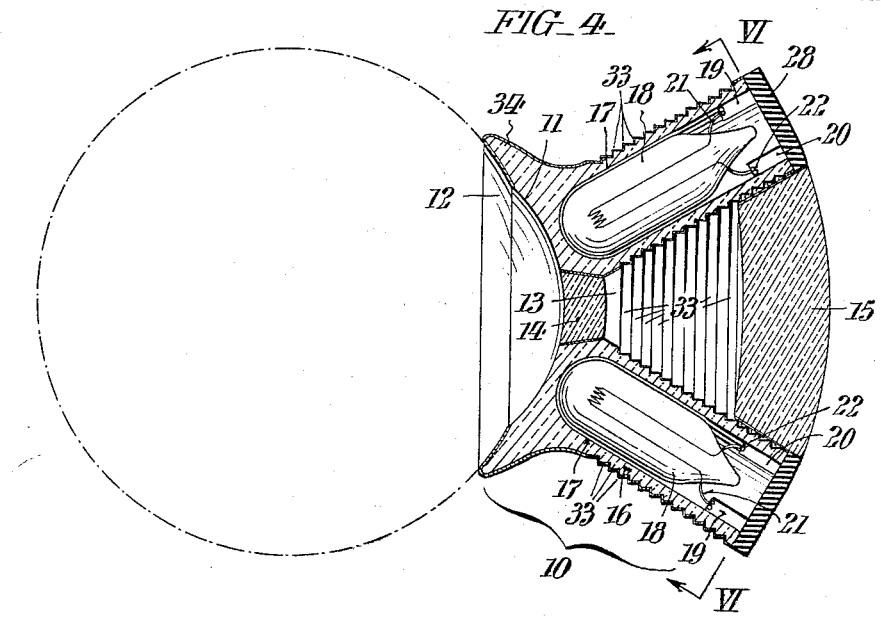
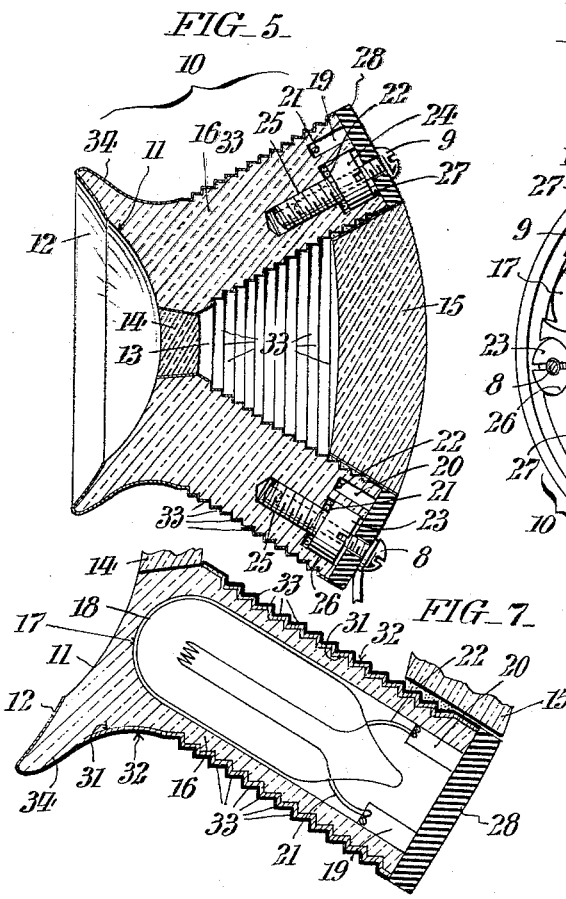
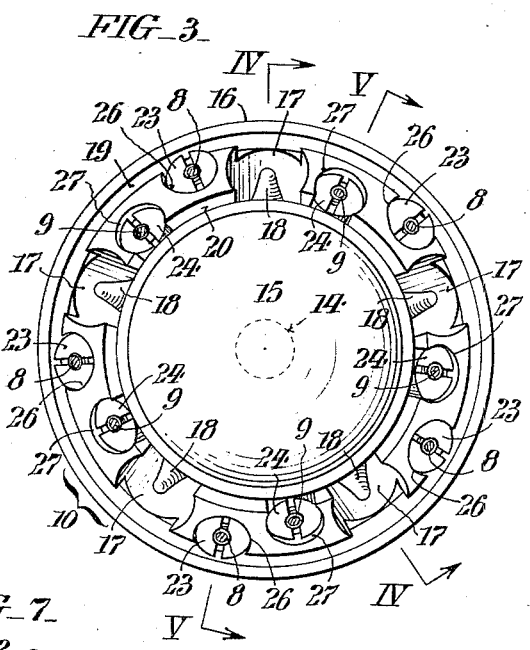
INVENTOR:
John Frederick Herbert,
BY Paul & Paul
ATTORNEYS.

Sept. 26, 1961  J. F. HERBERT  3,001,441
ANHYDRO-BLEPHAROSTATIC CONTACT LENS
Filed Aug. 5, 1957  3 Sheets-Sheet 3
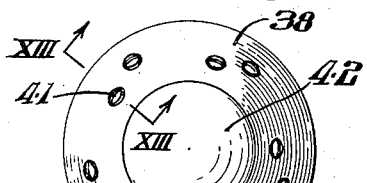
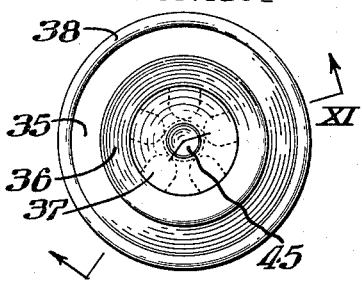
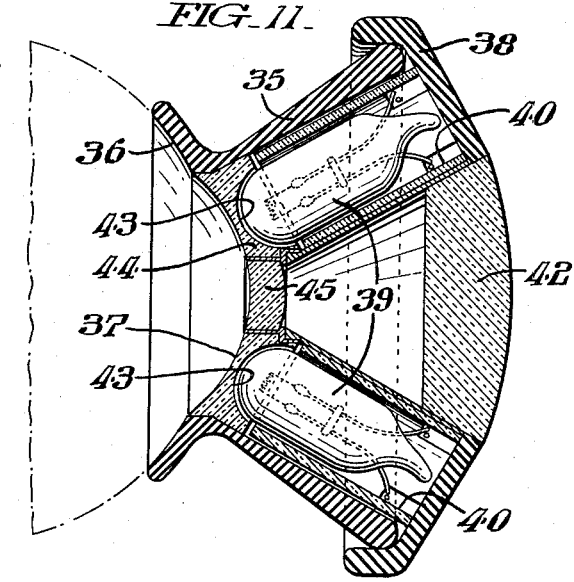
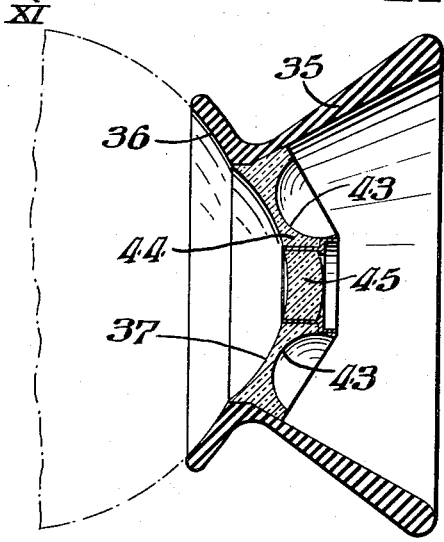
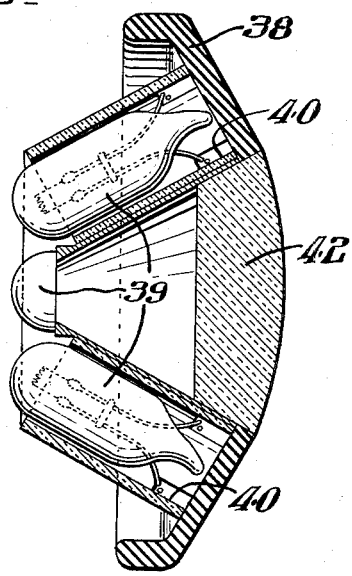
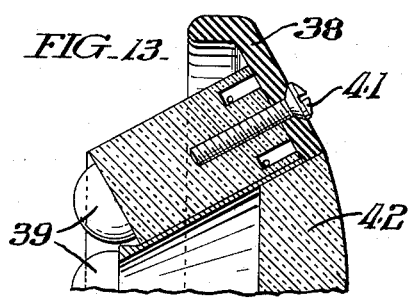
INVENTOR.
John Frederick Herbert,
BY Paul & Paul
ATTORNEYS

# United States Patent Office 3,001,441
Patented Sept. 26, 1961

3,001,441
ANHYDRO-BLEPHAROSTATIC CONTACT LENS
John Frederick Herbert, 605 Ashbourne Road,
Elkins Park, Pa.
Filed Aug. 5, 1957, Ser. No. 676,343
3 Claims. (Cl. 88—20)

This invention relates to an optical device for illuminating the interior of the eye and for producing an image thereof. The present invention is particularly directed to an optical illuminating device in the form of a contact lens embodying a system of lenses and means for providing diffused light.

One of the principal objects of the present invention is to provide an optical illuminating device in the form of a contact lens which is sufficiently light and small to be of practical use and, at the same time, is capable of furnishing diffused light of sufficient brightness for examining and photographing the interior of the eye and, particularly, for producing an image which may be photographed satisfactorily. A further object is to provide a device for illuminating the interior of the eye in which the illuminating source consists of diffused light positioned substantially at the surface of the cornea and extending over a substantial portion thereof. Additional objects and advantages will be apparent from the following description which refers to the accompanying drawings in which:

FIG. 1 is a top plan view.
FIG. 2 is a bottom view.
FIG. 3 is a top plan view with the outer insulation ring removed.
Fig. 4 is a cross-section view taken as indicated by the arrows IV—IV in FIG. 3.
FIG. 5 is a cross-section view taken as indicated by the arrows V—V in FIG. 3.
FIG. 6 is a plan view taken as indicated by the arrows VI—VI of FIG. 4.
FIG. 7 is an enlarged section of a portion of FIG. 4.
FIG. 8 is a wiring diagram showing the electrical connections.
FIG. 9 is a top plan view of an alternative form of the present invention.
FIG. 10 is a bottom view of an alternative form.
FIG. 11 is a cross-section view taken as indicated by the arrows XI—XI in FIG. 10.
FIG. 12 is an exploded view taken in section as in FIG. 11.
FIG. 13 is a cross-section view taken as indicated by the arrows XIII—XIII in FIG. 9.

The problem of illuminating the interior of the eye in order to examine and photograph parts such as the retina has been present in the art for many years. One of the devices heretofore suggested for accomplishing this is the subject of my expired United States Letters Patent No. 1,605,725, which issued on November 2, 1926. Illuminating devices made according to the teachings of the prior art have not provided a satisfactory solution to the two-fold problem of providing sufficient usable light while, at the same time, holding the size, weight and shape of the device within practical limits.

As shown in the drawings, the optical illuminating device of the present invention consists of a unitary holder element 10 which is so dimensioned as to permit being fitted over the eye as a contact lens as shown in FIG. 4. The holder 10 has a concave seat 11 at one end suitable for fitting over the cornea of the eye as shown diagrammatically in FIG. 4. Contact element 12 is positioned at the scleral portion. As described at a later point in this specification, the seat 11 consists of a material which diffuses light. While it would be possible to construct this seat so that its surface was sufficiently smooth to be used as the contact surface against the cornea of the eye, thus eliminating the need for the contact element 12, it is much more practical to provide a smooth and transparent contact element as shown at 12 for actual contact with the eye. Extending from the inner part of the concave seat 11 to the other end of the holder 10 is a frusto conical bore 13 with a lens 14 fixedly mounted in the small end of the bore 13 adjacent the cornea of the eye and with a second lens 15 mounted in the large end of the conical bore. There is thus formed a divergent chamber between the lens 14 and the lens 15 which is completely isolated from the other elements of the device, and which makes possible a wide angle projection of images while, at the same time, protecting the projecting lenses from misting which would otherwise occur because of moisture and heat. Likewise, the enclosure of the projecting lens within the central chamber protects the lens from the moisture from the eye immersion solution. Surrounding the bore 13 is a circular wall 16 which is provided with a number of pockets 17 each of which terminates in a concavity and within which the illuminating elements 18 are positioned. At the outer end of the wall 16, there are two spaced annular channels 19 and 20 which receive the lead wires 21 and 22 of the illuminating elements 18. These wires are anchored at intervals by the contact elements 23 and 24 to form the circuit shown diagrammatically in FIG. 8, in which the lamps 18 are connected in parallel. The contact elements 23 and 24 are mounted in threaded cavities 25 which have enlarged pockets 26 and 27 at their upper ends to receive the enlarged heads of screws 23 and 24, and to provide a means for seating the lead wires 21 and 22 respectively. Channel 19 opens into outer pockets 26 and channel 20 opens into inner pockets 27. The contact elements 23 and 24 are internally as well as externally threaded, thus providing means for securing screws 8 and 9 which, in addition to acting as terminal screws for the electrical wiring, serve also as fastening means for holding in place the protective and insulating ring 28 which covers the various channels and pockets formed in the wall 16. The wires 29 and 30 are attached to a suitable source of electrical energy, such as a dry cell battery, and may be attached at their other ends to any of the contacts 8 and 9, provided one is attached to the outer ring of contacts 8 while the other is attached to the inner ring of contacts 9.

The holder 10 is preferably made of plastic material which is translucent. This has the great advantage of providing a diffused light source at the surface of the seat 11 which is far superior for carrying out the objects of the present invention than the undiffused light which would result from the use of illuminating elements positioned in the open and at a distance from the cornea. In order to conserve, and direct, the light of the illuminating elements 18, a reflecting coating is provided at the surfaces of the wall 16, as shown in FIG. 7, at 31. The reflecting coating 31 enhances the total brightness and creates a light chamber consisting of the body of the device. Light emerges from this light chamber only at the surface of the concave seat 11. Likewise, to prevent unwanted light exposure of the film and to minimize problems of reflection, the outer surfaces of the circular wall 16 are coated black as shown at 32 and are provided with serrations 33. In order to hold the eyelid open and to restrain winking, the body of the device is provided with a conical surface 34 which, in conjunction with the exterior periphery of the contact element 12, forms a blepharostat.

In operation, the device of the present invention provides an effect which has not heretofore been achieved in an optical illuminating device, so far as I know. With the contact lens in place over the eyeball of the subject and the camera or other photographic device properly positioned at the projection distance of the image to be formed, the electrical circuit is closed, thus energizing the lighting elements 18. This produces an emission of light which emerges from the translucent material of the body 10 only at the corneal portion of the concave surface forming the cavity 11. This diffused light travels directly to the retina of the eye which is thus brightly illuminated by the even and diffused light which is directed at the retina by the concave surface of the cavity 11. The illumination is therefore in the form of diffused light at all times so far as the interior of the eye is concerned and, likewise, the illumination is at the corneal surface and not positioned at a location in space external to the eye since the contact surface becomes luminous and thus emits a diffused light at the concave contact surface. This provides the great advantage of bringing the light source closer to the interior of the eye to be illuminated, while, at the same time, bringing the light to the eye properly diffused and at a location which reduces to a minimum the possibility of corneal reflexes. The image of the thus illuminated retina is projected by means of the lens 14 and the lens 15 and the projected image is photographed in the usual way.

In the alternative form of the present invention shown in FIGS. 9 to 14 inclusive, provision has been made for inactivating the eyelid and thus preventing a misting of the anterior refracting surface. It has been found that when the eyelid slides over the anterior surface of the lens, the refractive surface becomes moistened from the lacrimal fluids and thus adversely affects the clearness of the surface and produces a blurring of the image, particularly when the device is used in photographing the retina.

In the alternative form there is presented an anhydro-blepharostatic contact lens in which an annular flange 35 is provided which circumscribes the corneal area and extends outwardly from its anterior surface. This protective flange is best shown in FIGS. 11 and 12, where it will be noted that the scleral area 36 of the contact lens 37 is covered. The material of the flange 35 may be of rubber or other opaque material, and therefore serves as part of an externally positioned light proof chamber over which there is fitted in light tight relationship the opaque cover element 38. Illuminating elements 39 are positioned in the chambers 40 shown attached to the cover element 38 in FIG. 13 by means of the screws 41 and are connected to the electrical leads 46 shown in FIG. 9. The combination of cover element 38, chambers 40, illuminating elements 39 and the lens 42 thus comprise a detachable illuminator which can be snapped into place within the space formed between the walls of the holder 35. In so doing the lighting elements 39 fit into pockets 43 which are formed in the body portion 44 which overlies the corneal portion of the contact lens element 37. As shown in FIG. 11, the lens 45 is also held in position within the body element 44.

In addition to inactivating the eyelid and preventing misting of the lens, the alternative form of the invention shown in FIGS. 9 to 13 provides a device which can be easily disassembled while attached to the eye of the subject. As shown in FIG. 12, the entire illuminator may be removed from the rest of the structure, thus decreasing the total weight and also making it possible to keep the contact lens and its associated elements cool while the preliminary adjustments are being made. The illuminator is then snapped into position just before the photograph is taken, and can be again removed immediately after the taking of the photograph. This is of particular advantage when it is desired to take a number of photographs of the same subject, since the absence of undue heating and the avoidance of formation of mist makes it possible to leave the contact lens and its associated annular flange 35 in position between photographs.

This application is a continuation in part of my earlier filed application, Serial No. 472,798 filed on December 3, 1954, and officially abandoned August 5, 1957.

While I have described the optical illuminating device of the present invention by reference to preferred embodiments as shown in the drawings, it will be understood that various modifications and changes in the specific structure may be made within the scope of the present invention defined in the appended claims.

Having thus described my invention, I claim:

1. An optical illuminating device comprising two separable parts in combination, the first part comprising a generally hollow eye-contacting holder containing light-refracting and light-diffusing elements, and the second part comprising an illuminator adapted to be held by said first part, said first part or holder comprising a frusto-conical shell of opaque material having axially positioned therein at the smaller diameter forward end thereof an annular body of translucent light-diffusing material having a concave surface shaped and adapted to be placed adjacent substantially all of the corneal surface of the human eye except for the central opening, a light-refracting lens element mounted within said central opening, and a plurality of depressions formed in the rearward surface of said annular body of translucent light-diffusing material at spaced-apart locations along a circular path surrounding said lens element, said second part or illuminator comprising a generally frusto-conical body of translucent material adapted to fit into the rearward open end of said frusto-conical holder, said frusto-conical translucent body having a frusto-conical bore extending axially therethrough, said bore having an opaque wall, said frusto-conical translucent body having a plurality of spaced-apart cavities therein open at the forward end but closed at the rearward end for receiving illuminating elements, the forward open ends of said cavities being adapted, when said second part is fitted into said first part, to match with and be closed by said depressions in the light-diffusing material, said depressions being adapted to receive the front portion of said illuminating element, said second part having an annular opaque backing having a peripheral extension forming a flange for abutment and ready separation with the rearward annular edge of said first part when the two parts are placed in, and taken out of, interfitted engagement.

2. An optical illuminating device as claimed in claim 1 characterized in that a second lens element is mounted in the larger rearward opening of said frusto-conical bore of said second part.

3. An optical illuminating device as claimed in claim 1 characterized in that said first part has an annular frusto-conical flange of opaque material at the forward end surrounding said light-diffusing material and adapted to seat on the scleral area of the human eye.

References Cited in the file of this patent

UNITED STATES PATENTS

| | | |
|---|---|---|
| 1,548,780 | Herbert | Aug. 4, 1925 |
| 1,605,725 | Herbert | Nov. 2, 1926 |
| 1,806,318 | Tillyer | May 19, 1931 |
| 2,430,851 | Allen | Nov. 18, 1947 |
| 2,586,973 | McMillin | Feb. 26, 1952 |